(12) United States Patent
Piwowarski

(10) Patent No.: US 6,963,760 B2
(45) Date of Patent: Nov. 8, 2005

(54) METHOD AND APPARATUS FOR GENERATING DTMF TONES USING VOICE-RECOGNITION COMMANDS DURING HANDS-FREE COMMUNICATION IN A VEHICLE

(75) Inventor: James J. Piwowarski, Holly, MI (US)

(73) Assignee: General Motors Corporation, Detroit, MI (US)

( * ) Notice: Subject to any disclaimer, the term of this patent is extended or adjusted under 35 U.S.C. 154(b) by 566 days.

(21) Appl. No.: 09/968,132

(22) Filed: Oct. 1, 2001

(65) Prior Publication Data

US 2003/0064755 A1 Apr. 3, 2003

(51) Int. Cl.[7] .............................................. H04M 1/00
(52) U.S. Cl. ..................... 455/563; 455/24; 455/550.1; 455/569.1; 370/278; 370/282; 370/286; 704/246
(58) Field of Search ....................... 455/24, 28, 550.1, 455/563, 569.1; 370/278, 282, 286; 704/246

(56) References Cited

U.S. PATENT DOCUMENTS

| | | | | |
|---|---|---|---|---|
| 5,297,183 A | * | 3/1994 | Bareis et al. | 455/410 |
| 5,539,731 A | * | 7/1996 | Haneda et al. | 370/286 |
| 5,651,056 A | * | 7/1997 | Eting et al. | 379/88.01 |
| 5,680,393 A | * | 10/1997 | Bourmeyster et al. | 370/286 |
| 6,128,482 A | * | 10/2000 | Nixon et al. | 455/414.1 |
| 6,198,947 B1 | * | 3/2001 | Barber | 455/563 |
| 6,282,176 B1 | * | 8/2001 | Hemkumar | 370/276 |
| 6,324,170 B1 | * | 11/2001 | McClennon et al. | 370/286 |
| 6,385,176 B1 | * | 5/2002 | Iyengar et al. | 370/286 |
| 6,505,161 B1 | * | 1/2003 | Brems | 704/270 |
| 6,587,824 B1 | * | 7/2003 | Everhart et al. | 704/275 |
| 6,687,517 B2 | * | 2/2004 | Kinnunen | 455/569.1 |
| 6,728,223 B1 | * | 4/2004 | Litzenberger et al. | 370/286 |

FOREIGN PATENT DOCUMENTS

GB 2240452 A * 7/1991 ............ H04B/3/23

* cited by examiner

Primary Examiner—William Trost
Assistant Examiner—James D Ewart
(74) Attorney, Agent, or Firm—Anthony Luke Simon

(57) ABSTRACT

An apparatus, method, and code on a computer readable medium are provided for constructing and operating a vehicle communication unit that is adapted for enunciating an audio signal to the cabin of a vehicle, and for simultaneously receiving the enunciated audio signal and a voice-command from a user speaking in the cabin of the vehicle, and for generating a DTMF signal in response to the voice-command without muting or otherwise interrupting the enunciated audio signal.

25 Claims, 1 Drawing Sheet

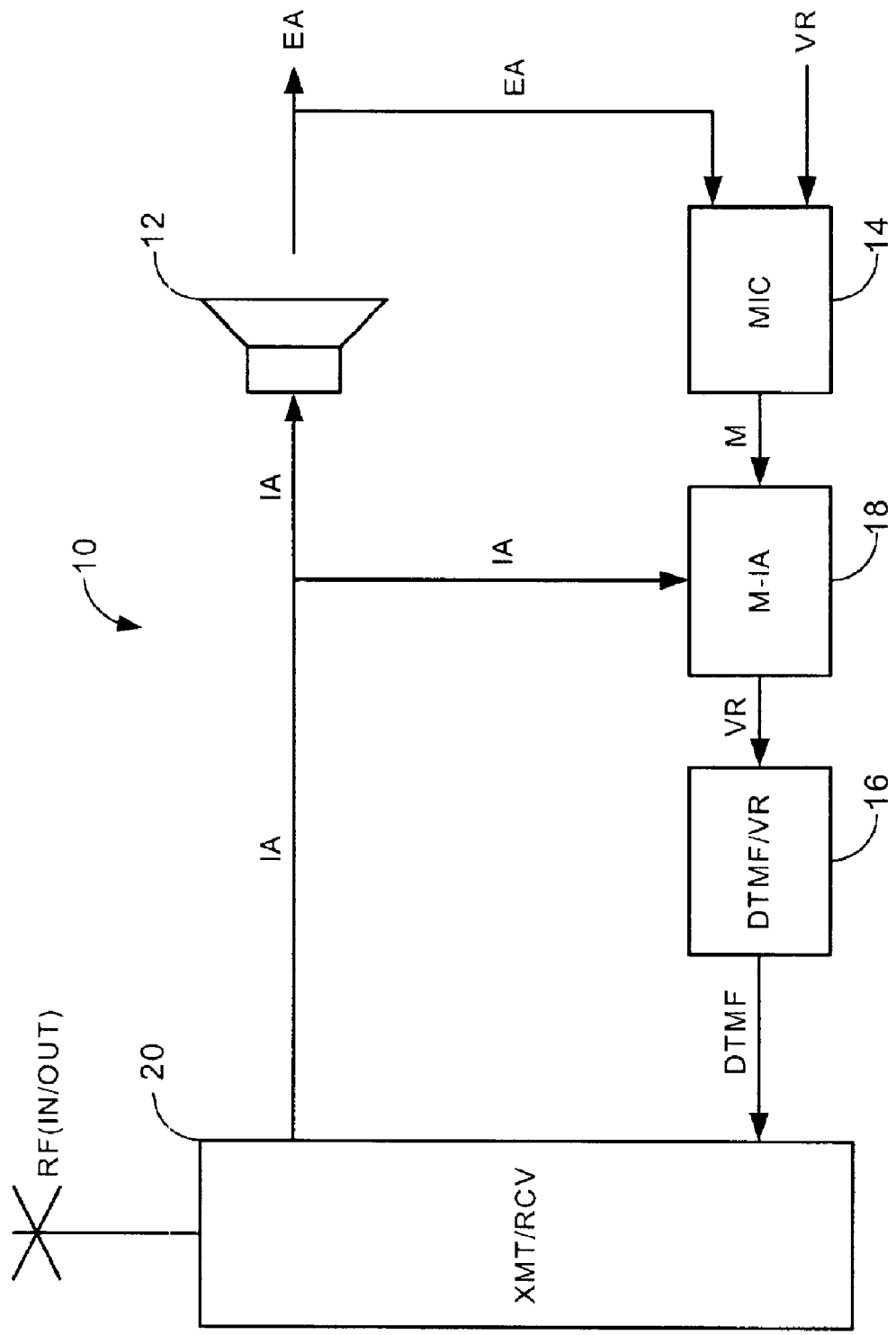

METHOD AND APPARATUS FOR GENERATING DTMF TONES USING VOICE-RECOGNITION COMMANDS DURING HANDS-FREE COMMUNICATION IN A VEHICLE

TECHNICAL FIELD OF THE INVENTION

This invention relates to mobile communication units, and more particularly to operating mobile communication units within a vehicle in a hands-free mode.

BACKGROUND OF THE INVENTION

Mobile communication units (MCU), such as cellular phones, personal data assistants (PDA's), and Global Positioning System (GPS) devices are often operated by a user driving or riding in a vehicle, such as an automobile or a truck, for receiving and transmitting information in a variety of formats including telephone conversations, voice mail, and FAX or data transmissions.

If the user wishes to drive the vehicle while communicating through the MCU, it is desirable, and may soon be required by law, that the user be able to operate the MCU in a so-called "hands-free" mode, wherein the user does not need not hold the MCU or press any buttons or keys to communicate through or control the MCU.

To allow hands-free operation, an MCU is sometimes permanently mounted in a vehicle, or adapted to fit into a cradle permanently mounted inside the cabin of the vehicle. Such a permanently mounted or cradle mounted MCU is commonly known as an on-board Vehicle Communication Unit (VCU). A vehicle communication unit may include a variety of input/output devices in the passenger cabin of the vehicle to aid the user in communicating through the VCU. These input/output devices may include keyboards, buttons or touch=screens, data ports, or a video screen for displaying incoming information and controlling the VCU. The VCU may also include a loudspeaker and a microphone in the cabin so that the user can hear incoming audio messages without using an ear-piece or headset, and a microphone so that the user can communicate through the VCU by simply speaking within the vehicle cabin.

For optimal hands-free communication, the VCU must allow the user to operate and control the VCU while driving the vehicle, without requiring the driver to divert his gaze and hands from the task of driving to receive input information, or to locate and actuate buttons, keyboards, or other input/output devices. In this regard, it is desirable that the VCU allow the user to receive incoming information from the VCU as audio enunciated in the cabin, and communicate through VCU by simply speaking within the cabin in a normal tone or voice.

It is also desirable that the user be able to control the VCU, and perform such tasks as switching between VCU functions or dialing phone numbers with spoken voice-commands that are recognizable by voice-recognition (VR) devices or software within the VCU. It is highly desirable that the user be able to utilize voice-control by simply speaking a voice-command while simultaneously hearing the enunciated audio. A user would thus be able to hear incoming voice mail messages, for example, or hear navigation information, while simultaneously using voice-commands to step through a list of voice mail messages, or to dial a telephone number with voice-commands.

For the user to be able to dial numbers, or communicate numeric commands over a standard telephone communication system, it is necessary that the VR system be able to generate signals in a format known as Dual Tone Multiple Frequency (DTMF). Unfortunately, however, prior vehicle communication units do not allow the user to utilize voice-control to generate DTMF signals by simply speaking a voice-command while simultaneously hearing the enunciated audio. Existing voice-recognition devices and software require a much higher degree of purity in the voice-command for effective VR control that is required for normal telephone conversations. Where the VCU enunciates audio into the cabin of the vehicle, the enunciated audio is acoustically linked and combined with any spoken voice-command from the user. The microphone of the VCU simultaneously receives both the enunciated audio and the spoken voice-command, together with any background noise in the cabin. The enunciated audio signal and background noise contaminates, or garbles, the voice-command to such an extent that the VR device or software has difficulty discerning that the contaminated audio received by the microphone contains a VR command. Even if the VR system does successfully detect that the combined audio signal received by the microphone contains a voice-command, the VR system may still be unable to discern exactly what command has been given. The VR system cannot generate the DTMF signal desired by the user until it both detects and can discern what voice-command the user has spoken.

What is needed, therefore, is an improved VCU providing a solution to one or more of the problems defined above.

SUMMARY OF THE INVENTION

My invention provides such an improved VCU, adapted for enunciating an audio signal EA to the cabin of a vehicle, and for simultaneously receiving the enunciated audio signal EA and a voice-command VR from a user speaking in the cabin of the vehicle, and for generating a DTMF signal in response to the voice-command VR without muting or otherwise interrupting the enunciated audio signal EA.

In one form of my invention, the VCU generates a combined signal M from the simultaneously received enunciated audio signal EA and voice-command VR, and removes the enunciated audio signal EA from the combined signal M. The VCU may also be adapted to receive an audio input signal IA, and generate the enunciated audio signal EA from the audio input signal IA. The VCU may then simultaneously receive the input audio signal IA and the combined signal M, and remove the enunciated audio signal EA from the combined signal M by subtracting the input audio signal IA from the combined signal M.

A VCU according to my invention may include a microphone, a voice-recognition engine and a discriminator. The microphone is located within the vehicle cabin for simultaneously receiving the enunciated audio signal EA and the voice-command VR, and for generating a combined microphone output signal M. The voice-recognition engine is adapted for receiving a voice-recognition command VR and generating a DTMF signal. The discriminator is adapted for receiving the combined microphone output signal M, removing the enunciated audio signal EA from the combined microphone output signal M, and for generating a voice-recognition command VR for communication to the voice-recognition engine.

The discriminator may be further adapted to receive the input audio signal IA and subtract the input audio signal IA from the combined output signal M. The discriminator may include a digital signal processor that is programmable to subtract the input audio signal IA from the combined microphone output signal M. The discriminator may be an acoustic echo cancellation unit. The VCU may also include a loudspeaker adapted for receiving the input audio signal IA and enunciating the enunciated audio signal EA to the vehicle cabin, with the input audio signal IA being provided to the discriminator and the loudspeaker in a parallel circuit relationship.

The VCU may also include a radio frequency receiver for receiving a radio frequency representing the input audio signal IA and generating the input audio signal IA therefrom. The VCU may further include a radio frequency transmitter for receiving a DTMF signal from the voice-recognition engine and broadcasting a radio signal representing the DTMF signal.

Other forms of my invention include a method for operating a VCU as described herein, and an embodiment of my invention as code on a computer readable medium including instructions for a VCU configured and/or operated as described herein.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWING

The drawing is a schematic representation of an exemplary embodiment of a vehicle communication unit according to my invention.

DETAILED DESCRIPTION OF THE PRESENTLY PREFERRED EMBODIMENTS

The drawing depicts an exemplary embodiment, according to my invention, of a vehicle communication unit (VCU) 10 for operation in the cabin of a vehicle. The VCU 10 includes a means for enunciating an audio signal EA to the cabin in the form of a loudspeaker 12, and a means in the form of a microphone 14 for simultaneously receiving the enunciated audio signal EA and a voice-command VR from a user speaking in the vehicle cabin. The VCU 10 further includes means in the form of a voice-recognition engine 16 and a discriminator 18 for generating a DTMF signal in response to the voice-command VR without muting or otherwise interrupting enunciation of the audio signal EA in the vehicle cabin.

The microphone 14 generates a combined microphone output signal M from the simultaneously received enunciated audio EA and voice-recognition VR signals. The discriminator 18 is adapted to receive the combined signal M from the microphone 14. The discriminator 18 removes the enunciated audio signal EA portion of the combined signal M and generates an output representing the voice-command portion VR of the combined signal M. The voice-recognition engine 16 receives the voice-command VR signal from the discriminator 18 and generates a DTMF signal corresponding to the received voice-command VR.

The VCU 10 further includes a radio frequency transmitter/receiver 20 for receiving an input signal RF IN representing an input audio signal IA, from which the VCU generates the enunciated audio signal EA emanating from the loudspeaker 12. The transmitter/receiver 20 is further adapted to receive the DTMF signal from the voice-recognition engine 16, and to transmit an output radio frequency signal RFOUT representing the DTMF signal.

The input audio signal IA representing the enunciated audio signal EA is fed simultaneously, in a parallel circuit fashion to the loudspeaker 12 and the discriminator 18. The discriminator 18 of the exemplary embodiment removes the enunciated audio signal EA from the combined signal M by subtracting the input audio signal IA from the combined signal M, to produce an output signal representing the voice-command VR portion of the combined signal.

In one form of my invention, it is contemplated that the discriminator 18 will include a digital signal processor DSP that is programmable to subtract the input audio IA from the combined signal M in a manner that provides an output signal from the discriminator representative of the voice-command VR. In a preferred embodiment, the DSP is also configured to include an echo cancellation circuit which will remove or reduce any portion of the combined signal M resulting from the enunciated audio signal EA received by the microphone 14.

My invention also contemplates a method for operating a vehicle communication unit VCU 10 adapted for enunciating an audio signal EA to the cabin for a vehicle, and for simultaneously receiving the enunciated audio signal EA and a voice-command VR from a user speaking in the cabin of the vehicle. The method includes generating a DTMF signal in response to the voice-command VR without muting or otherwise interrupting the enunciated audio signal EA. One form of a method according to my invention includes generating a combined audio signal M from the simultaneously received enunciated audio signal EA and voice-command VR, and removing the enunciated audio signal EA from the combined signal M.

The method may further include receiving an input audio signal IA and generating the enunciated audio signal EA from the input audio signal IA. The VCU simultaneously receives the input audio signal IA and the combined signal M, and removes the enunciated audio signal EA from the combined signal by subtracting the input audio signal IA from the combined signal M.

I also contemplate that my invention may take the form of a code on computer readable medium for operating a VCU adapted for enunciating an audio signal EA to the cabin of a vehicle, and for simultaneously receiving the enunciated audio signal EA and a voice-command VR from a user speaking in the cabin of the vehicle. The code includes an instruction for generating a DTMF signal in response to the voice-command VR without muting or otherwise interrupting the enunciated audio signal EA. The code may also include an instruction for generating a combined signal M from the simultaneously received enunciated audio signal EA and voice-command VR, and an instruction fro removing the enunciated audio signal EA from the combined signal M.

The code may also include an instruction for receiving an input audio signal IA representative of the enunciated audio signal EA, and generating the enunciated audio signal EA from the input audio signal IA. The code may further include an instruction for simultaneously receiving the input audio signal IA and the combined signal M, and an instruction for removing the enunciated audio signal EA from the combined signal M by subtracting the enunciated audio signal EA from the combined signal M.

While the embodiments of my invention disclosed herein are presently considered to be preferred, various changes and modifications can be made without departing from the spirit and scope of the invention. The scope of the invention is indicated in the appended claims, and all changes or modifications within the meaning and range of equivalents are intended to be embraced therein.

I claim:

1. A vehicle communication unit for operation in a cabin of a vehicle, the vehicle communication system comprising:
   means for enunciating an audio signal to the cabin of the vehicle, and for simultaneously receiving the enunciated audio signal and a voice-command from a user speaking in the cabin of the vehicle; and
   means for generating a DTMF signal in response to the voice-command without muting or otherwise interrupting enunciation of the audio signal in the vehicle cabin.

2. The vehicle communication unit of claim 1 further comprising:
   means for generating a combined signal from the simultaneously received enunciated audio signal and voice-command; and
   means for removing the enunciated audio signal from the combined signal.

3. The vehicle communication unit of claim 2 further comprising:
   means for receiving an input audio signal and generating therefrom the enunciated audio signal; and
   means for simultaneously receiving the input audio signal and the combined signal, and for removing the enunciated audio signal from the combined signal by subtracting the input audio signal from the combined signal.

4. The vehicle communication unit of claim 1 further comprising:
   a microphone located within the vehicle cabin for simultaneously receiving the enunciated audio signal and voice-command, and for generating a combined microphone output signal;
   a voice-recognition engine adapted for receiving a voice-recognition command and generating a DTMF signal; and
   a discriminator adapted for receiving the combined microphone output signal, removing the enunciated audio signal from the combined microphone output signal, and generating a voice-recognition command for communication to the voice-recognition engine.

5. The vehicle communication unit of claim 4 wherein the discriminator is further adapted to receive an input audio signal and subtract the input audio signal from the combined microphone output signal.

6. The vehicle communication unit of claim 5 wherein the discriminator includes a digital signal processor programmable to subtract the input audio signal from the combined microphone output signal.

7. The vehicle communication unit of claim 5 wherein the discriminator is an acoustic echo cancellation circuit.

8. The vehicle communication unit of claim 4 further including a loudspeaker adapted for receiving an input audio signal and for enunciating the enunciated audio signal to the vehicle cabin, and wherein the input audio signal is provided to the discriminator in parallel to the loudspeaker.

9. A vehicle communication unit adapted for enunciating an audio signal to the cabin of a vehicle, and for simultaneously receiving the enunciated audio signal and a voice-command from a user speaking in the cabin of the vehicle, the vehicle communication unit comprising:
   a microphone located within the vehicle cabin for simultaneously receiving the enunciated audio signal and voice-command, and for generating a combined microphone output signal;
   a voice-recognition engine adapted for receiving a voice-recognition command and generating a DTMF signal; and
   a discriminator adapted for receiving the combined microphone output signal, removing the enunciated audio signal from the combined microphone output signal, and generating a voice-recognition command, for communication to the voice-recognition engine.

10. The vehicle communication unit of claim 9 wherein the voice-recognition engine includes a digital signal processor programmable to provide a DTMF signal in response to a voice-recognition command.

11. The vehicle communication unit of claim 9 further adapted for receiving an input audio signal and generating therefrom the enunciated audio signal, and wherein the discriminator is further adapted to receive the input audio signal and subtract the input audio signal from the combined microphone output signal.

12. The vehicle communication unit of claim 11 wherein the discriminator includes a digital signal processor programmable to subtract the input audio signal from the combined microphone output signal.

13. The vehicle communication unit of claim 11 wherein the discriminator is an acoustic echo cancellation circuit.

14. The vehicle communication unit of claim 11 further including a loudspeaker adapted for receiving the input audio signal and for enunciating the enunciated audio signal to the vehicle cabin, and wherein the input audio signal is provided to the discriminator in parallel to the loudspeaker.

15. The vehicle communication unit of claim 11 further including a radio frequency receiver for receiving a radio frequency signal representing the input audio signal and generating the input audio signal therefrom.

16. The vehicle communication unit of claim 11 further including a radio frequency transmitter adapted for receiving a DTMF signal from the voice-recognition engine and broadcasting a radio frequency signal representing the DTMF signal.

17. A method for operating a vehicle communication unit adapted for enunciating an audio signal to the cabin of a vehicle, and for simultaneously receiving the enunciated audio signal and a voice-command from a user speaking in the cabin of the vehicle, the method comprising:
   generating a DTMF signal in response to the voice-command without muting or otherwise interrupting the enunciated audio signal.

18. The vehicle method of claim 17 comprising:
   generating a combined signal from the simultaneously received enunciated audio signal and voice-command; and
   removing the enunciated audio signal from the combined signal.

19. The method of claim 18 further comprising:
   receiving an input audio signal and generating therefrom the enunciated audio signal;
   simultaneously receiving the input audio signal and the combined signal; and
   removing the enunciated audio signal from the combined signal by subtracting the input audio signal from the combined signal.

20. Code on a computer readable medium for operating a vehicle communication unit adapted for enunciating an audio signal to the cabin of a vehicle, and for simultaneously receiving the enunciated audio signal and a voice-command from a user speaking in the cabin of the vehicle, the code comprising:

an instruction for generating a DTMF signal in response to the voice-command without muting or otherwise interrupting the enunciated audio signal.

21. The code on a computer readable medium of claim 20 further comprising:

an instruction for generating a combined signal from the simultaneously received enunciated audio signal and voice-command; and an instruction for removing the enunciated audio signal from the combined signal.

22. The code on computer readable medium of claim 21 further comprising:

an instruction for receiving an input audio signal and generating therefrom the enunciated audio signal;

an instruction for simultaneously receiving the input audio signal and the combined signal; and an instruction for removing the enunciated audio signal from the combined signal by subtracting the input audio signal from the combined signal.

23. A vehicle communication unit for operation in the cabin of a vehicle comprising:

a loudspeaker for enunciating an audio signal;

a microphone for simultaneously receiving the enunciated audio signal and a voice command;

a voice recognition engine and a discrimination to generate a DTMF signal in response to the voice command without muting or interrupting enunciation of the audio signal.

24. The vehicle communication unit of claim 23 wherein the audio signal and voice command are combined to form a combined signal.

25. The vehicle communication unit of claim 24 wherein the combined signal is fed in a parallel circuit to the loudspeaker and the discriminator.

* * * * *